United States Patent [19]

Ensor

[11] Patent Number: 4,626,906
[45] Date of Patent: Dec. 2, 1986

[54] INVERTED MICROSCOPE

[76] Inventor: Donald R. Ensor, 111 Western Springs Road, Auckland, New Zealand

[21] Appl. No.: 592,822
[22] Filed: Mar. 23, 1984

[30] Foreign Application Priority Data

Apr. 8, 1983 [NZ] New Zealand .................. 203838

[51] Int. Cl.<sup>4</sup> ............................................ H06N 7/18
[52] U.S. Cl. .................................... 358/93; 350/508; 358/225; 358/229
[58] Field of Search ............... 358/93, 225, 229, 107; 350/502, 508; 354/79, 80

[56] References Cited
U.S. PATENT DOCUMENTS 3,829,609  8/1974  Payne .................. 358/107
4,210,384  7/1980  Meyer .................. 350/502
4,242,703  12/1980 Tsuboshima ............ 358/93
4,443,816  4/1984  Hogan .................. 358/107

OTHER PUBLICATIONS

Unitron Instrument Co. "Series N" Camera Microscopes publication, Newton Heights, Mass. 1965.

Primary Examiner—Howard W. Britton
Attorney, Agent, or Firm—Young & Thompson

[57] ABSTRACT

A microscope is arranged so that the light from the object under study is directed down through an objective lens and then to a video camera. None of it is diverted to an eye piece or the like. The image can be viewed on a video monitor. There is no clutter of optical equipment above the object, and there need be only enough light to operate the camera.

11 Claims, 10 Drawing Figures

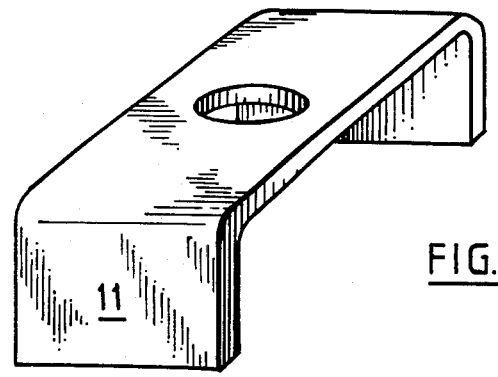
FIG. 3
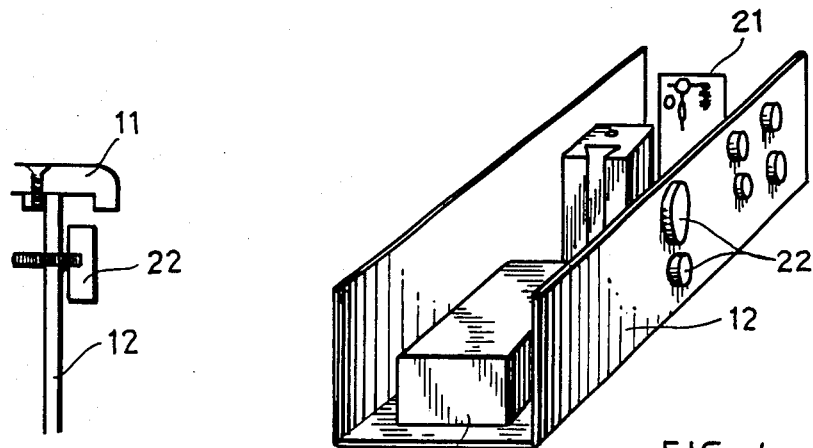
FIG. 5
FIG. 4
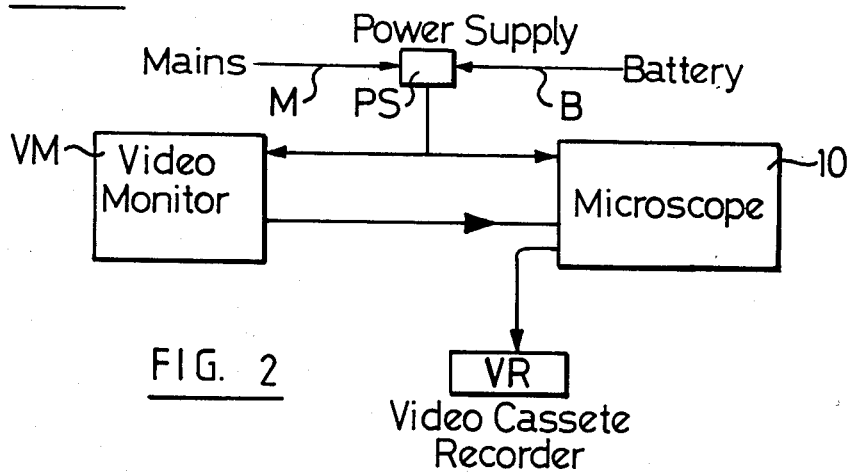
FIG. 2

INVERTED MICROSCOPE

BACKGROUND TO THE INVENTION

This invention relates to an inverted microscope in which living cells or tissues are viewed from the underneath of a slide, watch-glass, sterile bottle, or other container for the living cells. Inverted microscopes are so called because the objective lens is mounted beneath the slide, and thus it is possible to obtain an underside view of the object in question.

Existing inverted microscopes are expensive, have complex optics, and are not particularly suited to microsurgery where the experimenter has to position micromanipulators and micro tools in the medium containing the living cells, manipulate the cells, while viewing the operation through an eye piece. In most of them the focusing mechanism is effected by vertical movement of the stage, disturbing the positioning of the micromanipulators.

It is an object of this invention to provide an improved inverted microscope, or one which will at least provide experimenters with a useful choice.

SUMMARY OF THE INVENTION

In one aspect, the invention provides an inverted microscope having a substantially rigid stage below which is mounted an objective lens, and means for transmitting an image via said lens to a video camera so that, in use, substantially all of the light from the lens is directed to the camera.

By this means, it is possible to have a relatively uncluttered working surface on the relatively rigid stage in which to place and operate the micromanipulators. Moreover, it is believed that viewing the operation on a video monitor will be less tiring on experimenters or other operators carrying out lengthy microsurgery or the like.

In another aspect, the invention provides a method of viewing an article via a microscope, the method comprising the steps of placing the article on a substantially rigid stage, directing light from the article downwardly through an objective lens, directing substantially all of the light from the lens to a video camera, and viewing on a video monitor the image detected by the camera.

In effect, the microscope has no eye-piece, but instead has a camera or, alternatively, an attachment means by which a camera, rather than an eye-piece, may be attached, to receive the image formed by the objective lens. This is what is meant by the expression "substantially all of the light from the objective lens being directed to the camera." There is no beam-splitting arrangement for sharing the light between the camera and an eye-piece.

BRIEF DESCRIPTION OF THE DRAWINGS

FIG. 2 is a schematic view of the microscope and monitor;

FIG. 3 is a view of the microscope stage;

FIG. 4 is a view of the microscope chassis and components;

FIG. 5 is a partial transverse section showing the connexion between the stage and the chassis;

DESCRIPTION OF THE PREFERRED EMBODIMENTS

By mounting an objective lens beneath a relatively rigid stage, having a central aperture beneath which the objective lens can be positioned, it is possible to leave a relatively uncluttered working area on which micromanipulators, lights, or other accessories can be mounted. This can be achieved by providing a video camera either beneath the stage or adjacent to the stage, and feeding the signal from the video camera to a video monitor, which may comprise a directly observable cathode ray screen, and/or an image analysing computer, and/or a video recorder. This has the advantage of removing the eye piece and associated optics from the side or upper surface of the stage, thus allowing for more room for micromanipulators and the like. Moreover, the use of a video camera and associated video monitor screen enables more than one person to view the operation, making it possible for more than one person to operate the micromanipulators and also facilitating teaching and demonstration of such techniques.

The provision of a video camera and associated monitor enables the monitor and/or camera to be wired in such a way that the picture on the monitor correctly reflects the handedness of the item being worked on. For example, if the optics reverses the right-left parity, this can be readily corrected by reversing the scanning of the camera or monitor by changing the polarity of the appropriate wires so that, for example, the image on the monitor scans from right to left, rather than from left to right, or vice-versa. Thus, the image on the monitor can be laterally reversed, and, if necessary, the image can also be inverted by an appropriate change in the scanning of the camera or monitor so that the image is scanned from bottom to top instead of from top to bottom.

Living tissues provide very little contrast when seen by conventional bright-field microscopy. To effect contrast, the image on the monitor will be enhanced, first by increasing the amplitude of the video signal in either a linear or an amplitude-dependent way. The signal may be differentiated to show up image outlines selectively. Other techniques are possible, such as the use of infrared sensitive cameras and the provision of a true-dimentional view, perhaps by using two cameras and a colour monitor's red and green channels, with red and green filters in spectacles for the operator(s). An electronic scale or rule can be provided on the monitor screen to measure the dimension of objects being studied. Such a scale can be moved around the screen by a "joy-stick" or other control.

Figure 1:
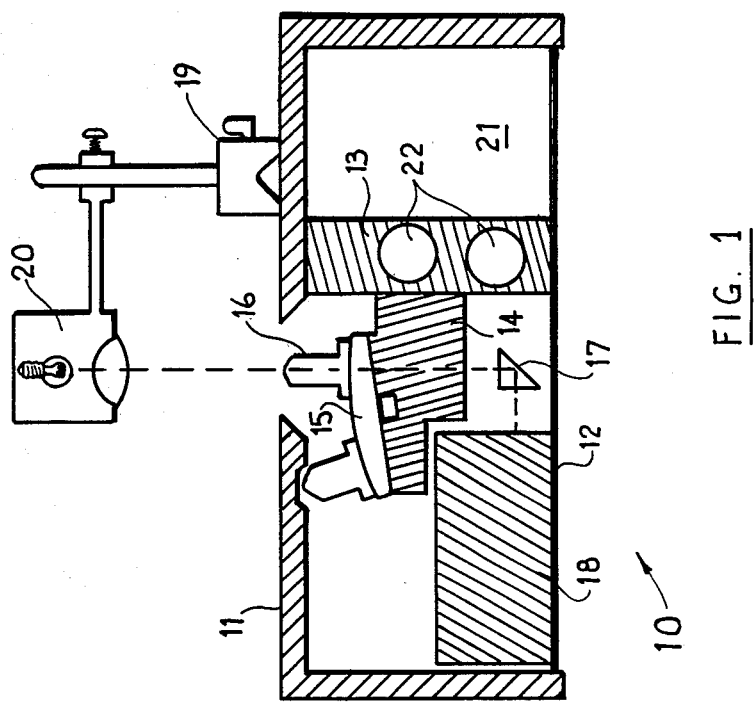
FIG. 1 is a cross-sectional view through a preferred video-inverted microscope.

The instrument illustrated in FIG. 1 is known as a video inverted microscope (VIM). An inverted microscope, as opposed to the usual upright design, is one in which the image-forming lenses, the objective lenses, are placed below the specimen on its supporting stage. An illuminator is arranged above the specimen. The image is reflected across from below the specimen and upwards to one or more eyepieces. Such microscopes are normally used to examine living material, such as cells, inside containers of fluid.

A "projection microscope" is one from which the image is optically projected onto a viewing screen as opposed to its usual presentation "within" the eyepieces. This type of microscope requires an intense light source and is used to minimise eyestrain, or, in large sizes, for demonstrations. The video inverted microscope provides all of the advantages of the projection microscope, but without the need for an intense light source, which can be damaging to some articles under study.

The video inverted microscope is indeed inverted; its objective lenses are below the stage, but it is unlike any conventional microscope in that it has no eyepieces for the operator to use. Instead, it employs a television camera to project an image onto a television screen and hence display a bright, magnified view of the object. Its other principal difference is that it has a large, rigid stage to provide a suitable working surface for microsurgery.

The video inverted microscope is a significantly different design. It has been designed especially for the examination, and more particularly for the manipulation, of tiny amounts of living biological material. It has a number of additional applications. Its primary advantages over conventional microscope designs are that it is much easier to use (especially over long periods) and that a clear sharp projected image may be made from the specimen without involving its destruction.

This concept of a video inverted microscope is a new idea, although there are many prior art inverted microscopes in existence, some of which offer a place for the attachment of a video camera as an accessory. With these other designs, the provision of or the use of a video camera port necessitates a certain amount of comprise. The video inverted microscope uses video techniques alone, and makes the most of this medium.

A first preferred video-inverted microscope 10 is shown in FIGS. 1 to 5 of the attached drawings. This has a relatively rigid stage 11 of inverted U-shaped configuration. This is preferably formed of steel, as this enables it to be used with magnetic clamps to hold illuminators, micromanipulators, and the like. The stage is preferably machined flat, and may be relatively heavy to enable it to provide an accurate flat surface onto which the sample can be placed. The large flat surface area allows for the use of various accessories.

It has a central aperture, beneath which the simple optics, and auxiliary components, can be mounted.

Preferably, the working components are mounted in a chassis 12, which is also of U-shaped channel configuration, best seen in FIG. 4. This is preferably suspended from the underside of the top of the stage 11, so that it does not contact the work bench. Contact is made by the legs at either end of the stage.

A focusing mechanism 13 is provided beneath the stage and may contain appropriate coarse and fine controls for moving the objective lens 16 held in a nose piece 15 containing two or more objective lenses. This nose piece is conveniently mounted on a moving support bracket 14, which is adjusted by the focus control 13, in the manner of a conventional focusing mechanism.

An alternative arrangement would be to replace the nose piece and array of objective lenses with a lens such as a zoom lens reversed. (In other words, what is normally the image plane of a camera's zoom lens becomes the object plane of the zoom lens in the microscope.) The lens can then be adjusted as required to vary the degree of magnification of the microscope.

Typically, a reflecting prism or mirror 17 is mounted beneath the aperture to reflect an image from the objective lens into a video camera 18. This is typically a compact television camera, and may be a conventional vidicon television camera, or a solid state camera (for example, a charge-coupled device), or a flying spot scanner and photomultiplier tube, or other appropriate means for converting an optical image into an electronic signal. Typically, the optical path length and the television camera will be of such a size that the camera can be mounted under the stage.

It will be appreciated that the working surface of the stage is relatively uncluttered, and that appropriate items can be mounted on the stage of magnetic clamps or the like. Such a magnetic clamp stand 19 is shown holding a source of illumination 20, as this enables the light source to be moved around the stage to provide the best lighting during the use of the microscope.

The remaining space 21 beneath the stage may be used for the video processing electronics.

The chassis 12 is preferably connected to the underside of the stage by appropriate fasteners, and the longitudinal edge of the stage may be shaped so that drips will miss the knobs 22 of the focusing mechanism, as the sides of the stage protrude beyond the knobs 22 as shown in FIG. 5. These longitudinal side edges of the stage may be shaped to provide a finger gripping surface, so that the microscope can be readily carried. It will be appreciated that the stage is formed of a relatively rigid material, so that it is relatively heavy, to provide rigidity and accuracy for the placing of slides, special stages, or the like above the working objective lens 16.

FIG. 2 is a schematic diagram showing an arrangement in which a signal from the microscope 10 can be transmitted to a video monitor VM and/or additional monitors or video cassette recorders VR or the like. A common power supply PS may be provided from batteries B or the mains M.

By removing the need for optical eye pieces from the top surface or sides of the stage, and by drastically simplifying the optics to an objective lens and reflecting surface such as a prism, the stage can be of much reduced height compared to conventional optical-inverted microscopes. For example, the stage height could be, say, 100 mm above the surface of a bench, making it a far more convenient height to control micromanipulators on the stage. With conventional opticalinverted microscopes, workers find it tiring to endeavour to operate micromanipulators at the height of the conventional microscope stage, which in any case is relatively cluttered compared to the stage of the video-inverted microscope of the invention.

Figure 6:
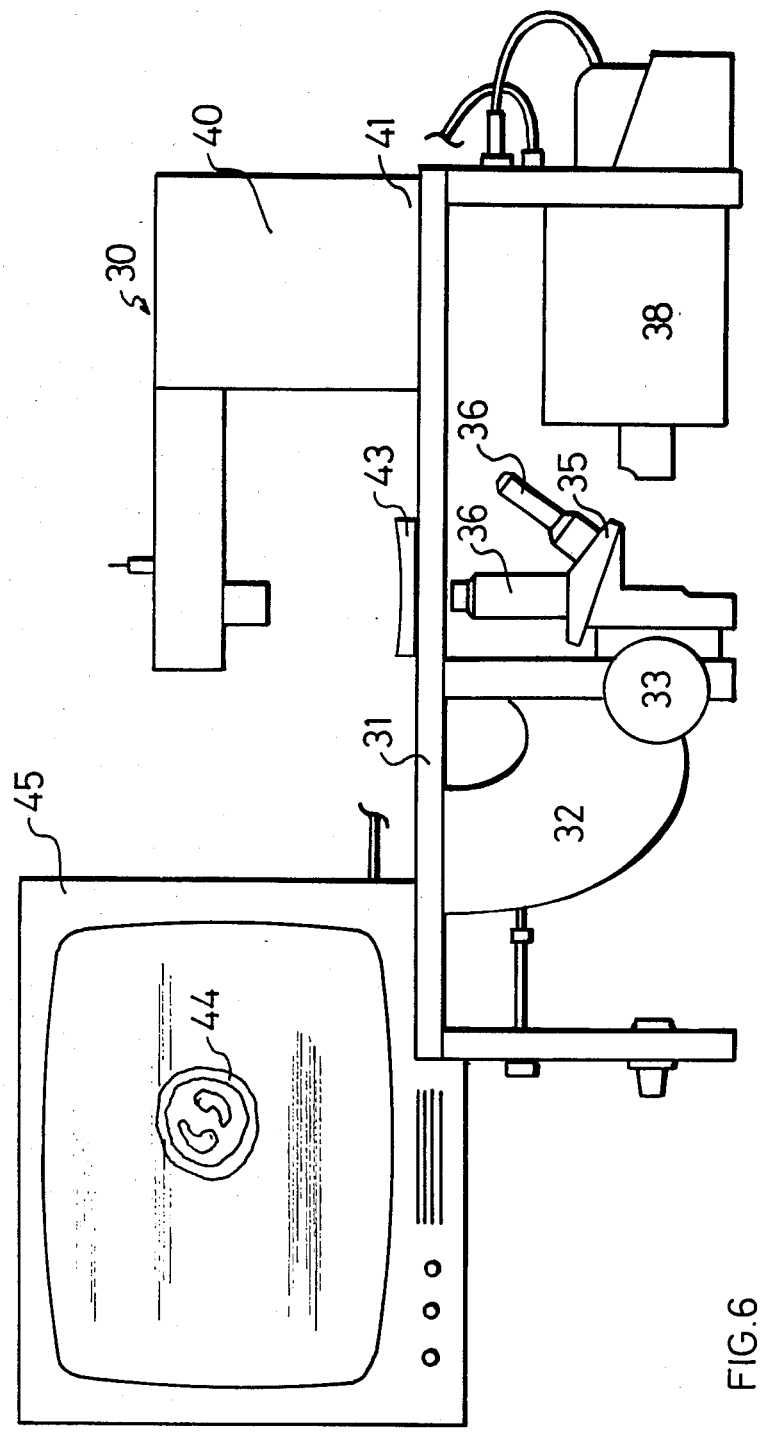
FIG. 6 is side view of a second microscope of the invention.

Turning now to FIG. 6 of the drawings, there is a second microscope 30 of the present invention. This includes a rigid stage 31, underneath which there is mounted on a chassis 32 a focussing mechanism 33. The focussing mechanism operates a support bracket 34, upon which there is a nose piece 35 carrying a plurality of alternative objective lenses 36. Light from the appropriate lens is directed to a camera 38.

Figure 7:
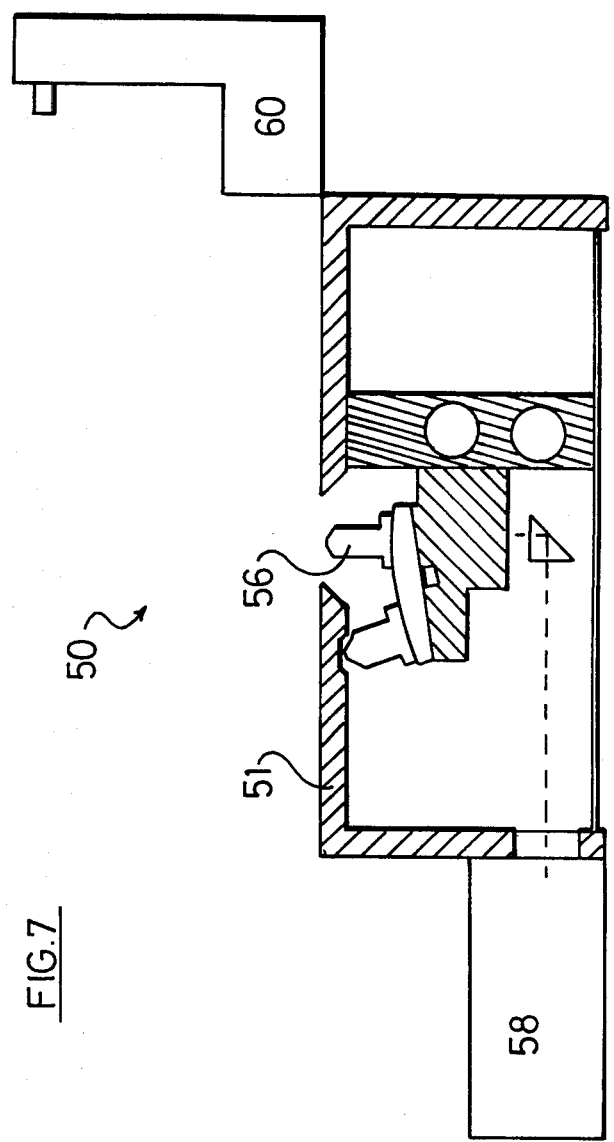
FIG. 7 is a sectional view of a third microscope of the invention.

Mounted upon the stage is a lamp stand 40, hinged to the stage at one corner 41 so that, if desired, it can be swung up out of the way (see FIG. 7). Light is directed downwardly through an object 43 to the objective lens, and eventually to the camera. The image 44 appears on a television screen 45.

FIG. 7 illustrates another microscope 50 of the present invention, differing from the first two in that the camera 58 is not fixed under the stage 51, but is, instead, removably attached to the outside of the stage. The light path from the objection lens 56 (indicated by the dashed line) passes through an aperture in the side of the stage to reach the camera. This arrangment enables the camera to be swapped for another, which may be desirable where the same microscope is used at different times for quite different tasks.

It is, nevertheless, important that the camera be provided with an attachment by which it can be firmly attached, such as by bolting, to the rest of the equipment. The invention provides an arrangement in which the objective lens and camera are secured together, in use, to ensure that the optical path is set. This avoids problems with having to align the objective lens and camera whenever a new camera is to be used.

Figure 8:
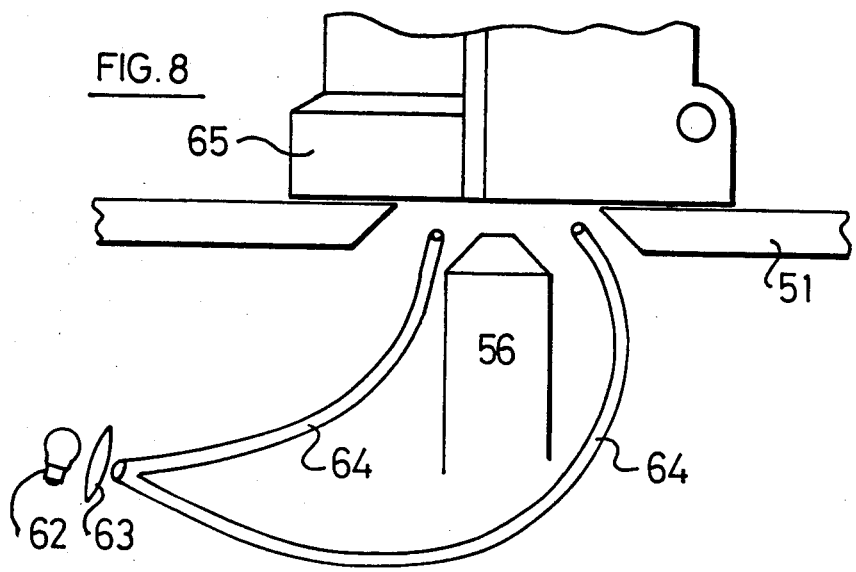
FIG. 8 illustrates a detail of the microscope of FIG. 7.

The light stand 60 is illustrated in its folded-back position, leaving the upper surface of the stage 51 completely unobstructed. In this case, a large or opaque object could be placed on the stage, and illuminated from beneath, as illustrated in FIG. 8. Here there is shown a lamp 62, light from which is collected by a lens 63 and directed into a plurality of light pipes 64, the ends of which are located near the objective lens 56 to direct the light at an object 65. Light from the object will be directed downwardly into the objective lens to transmit an image to the camera in the usual way.

This technique can be used to inspect the surface of metal or other objects for fine detail, such as in metallurgical investigations.

Figure 9:
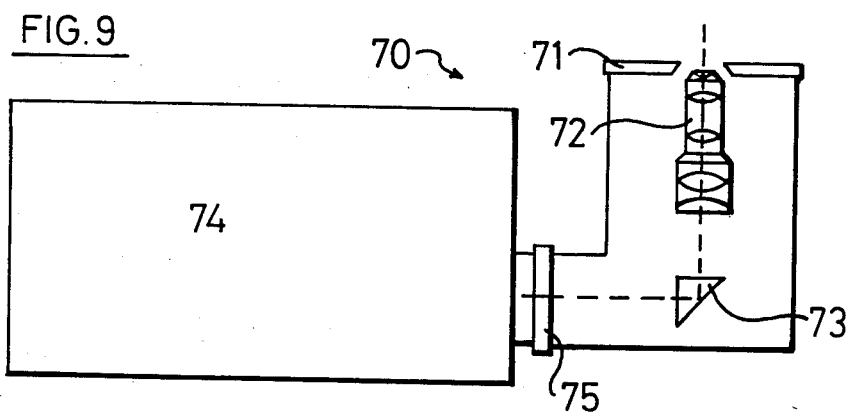
FIG. 9 is a sectional view of a microscope accessory of the present invention.

In FIG. 9 there is illustrated a microscope attachment 70 for an ordinary video camera of the type commonly used in schools and in private homes. The attachment includes a stage 71, a single objective lens 72 and a prism 73 for directing the image from the objective lens into a camera 74. The device is arranged to be attached to a standard lens mounting 75 on the front of the camera.

Thus, there is provided a relatively inexpensive accessory for an ordinary video camera to convert it into a video inverted microscope.

If desired, the objective lens may be removable so that it can be replaced by another lens with different magnification. Alternatively, a range of camera attachments 70 with different objective lenses may be provided so that different magnifications can be achieved by swapping attachments.

Figure 10:
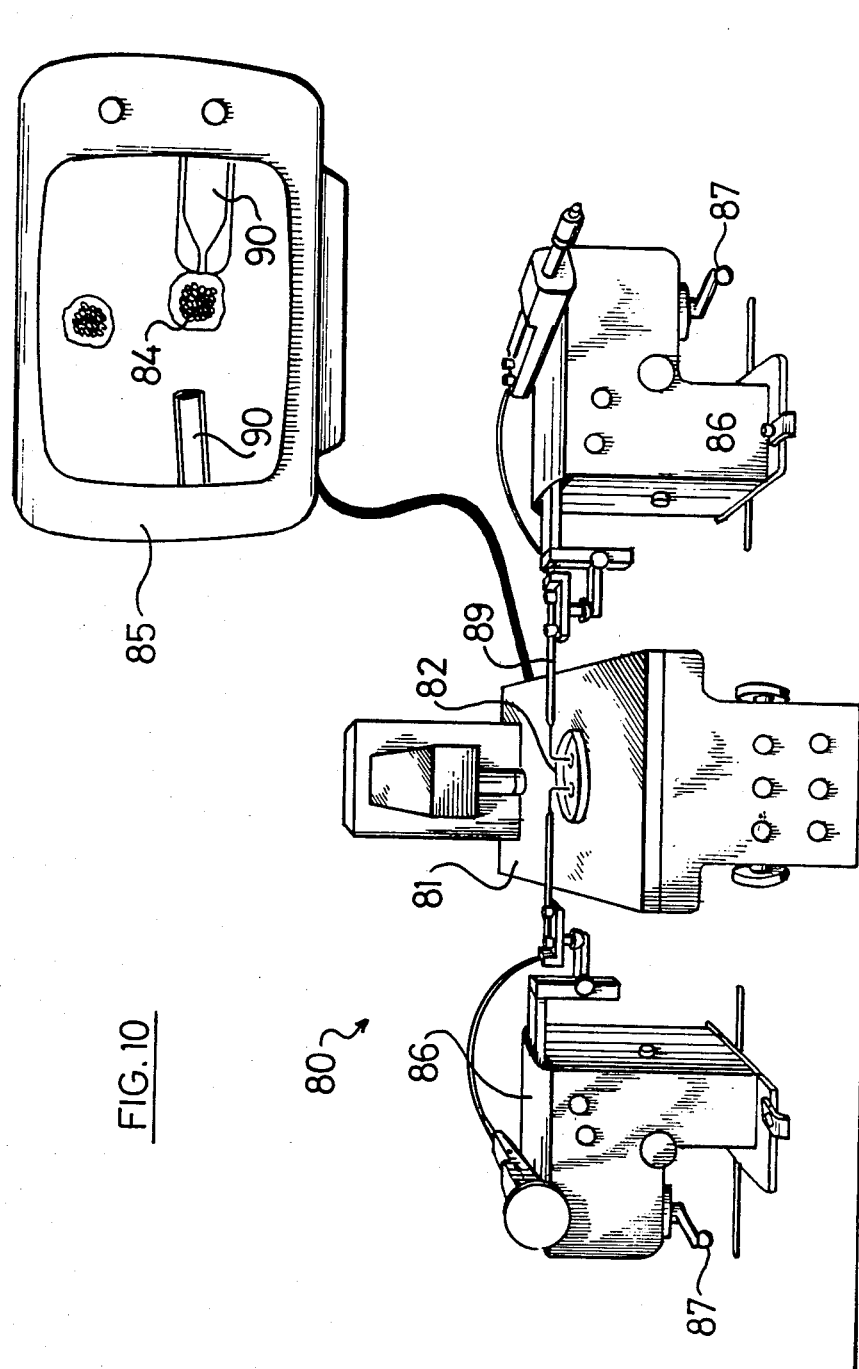
FIG. 10 is an end view of a microscope of the invention.

FIG. 10 is an end view of a microscope 80 of the present invention, which may be the same as the microscope 10, 30 or 50. The stage 81 is shown with a dish 82, in which there is a microscopic object, visible as an image 84 on the television screen 85. On each side of the stage 81 there is a micromanipulator 86, each provided with a manual control 87 for operating a respective rod 89, typically provided with a glass end, for manipulating the object 84. The ends of the rods 89 appear as images 90 on the screen.

The microscope of the present invention offers a number of advantages over the prior art microscopes referred to above. Firstly, there is less strain for the operator. The use of a microscope for a lengthy period can be quite a stressful exercise. One's body has to be held still, to align the eye with the eyepiece. The eye has to focus the image, and if the microscope is not well focused the eye has to compensate by over-focusing. If the specimen does not show up clearly, (if it has no intrinsic colouration), it is difficult to see internal details. This is the case in most forms of microsurgery, which require dedication and skill enough from the operator without imposing unnecessary additional demands. The video inverted microscope reduces operator strain considerably as it allows the operator to sit back, relax and look at a clear sharp projected image. This is most important if the work requires concentrated effort or lasts a long time—as it does in embryo microsurgery for example.

Secondly, the specimen remains still when the instrument is focused. Most modern conventional microscopes provide means to vary the height of the stage, bearing the specimen, to achieve best focus. This is unsatisfactory if the microscope is used in conjunction with externally mounted micromanipulators (as in microsurgery) because the tissues would be shifted vertically in relation to the tools used to hold or cut them. The tools would have to be readjusted every time the microscope was re-focused. In the video inverted microscope, focusing is performed by vertical movement of the objective lenses in relation to the fixed stage.

Thirdly, the microscope of the invention provides a good, stable, working surface. Because the bulk and weight of the video inverted microscope is almost entirely below the large, flat fixed stage, giving it a low centre of gravity, and, because the stage is built of thick metal, its design is much more appropriate for microsurgery than that of other kinds of microscope.

Fourthly, the specimen need not be stained with dyes to be made visible. Most biological material is nearly colourless, especially when present in small amounts up to perhaps a tenth of a millimetre thick. When using conventional microscopes, one has either to colour parts of the specimen selectively (usually destroying life in the process) or use specialised optical techniques (which require considerably greater illumination intensity) in order to make out details of the cells. The video inverted microscope avoids these problems. One simply adjusts the contrast in the television image by means of a "Contrast" knob.

Fifthly, the specimen is not damaged by excessive lighting. Conventional microscopes require a good deal of light from a source below the specimen; especially if specialised optical systems are to be used. Some biological tissues are particularly sensitive to light, particularly embryonic tissues in wihch chromosome damage may result in poor development or inherited defects in later generations. With the video inverted microscope, the risk of damage is minimised by an efficient optical system, transferring all the light to the image sensor, filtering the light source so that only the useful wavelengths are emitted, and placing the only significant source of heat above the work surface.

The video inverted microscope also has a number of advantages over other microscopes provided with video capabilities. As mentioned elsewhere, there are many other microscopes which can be used in conjunction with a television camera. All are conventional microscopes (i.e., with eyepieces as the primary means for viewing the image) with sites provided for the attachment of a (television) camera.

However, the microscope of the present invention has stability, and design convenience, when compared to these prior art microscopes. The television camera is normally a rather bulky and massive component, especially if it is a quality colour camera. When attached to a microscope frame above the stage (where the image has been formed by the objective lens), its extra mass often exaggerates the effects of vibration, causing loss of sharpness in the image whenever vibration is present. In addition, such a configuration is less stable and places more stresses on the frame than if the television camera were placed at ground level, as in the case of the video inverted microscope. In other words, the video inverted microscope may be the best possible choice of design for a general-purpose video microscope for educational demonstration applications.

Many other inverted microscopes already exist and two expensive models even offer fixed stages and ports where one may attach a television or a cine camera. However, this microscope is the only inverted design which relies solely on television to form the magnified image and is at the same time designed escpecially for microsurgery of biological material.

Manipulators may actually be screwed to the solid stage of this machine.

Also, the quality and compatibility of camera and visual display unit (television monitor) should be of a reasonable standard. A suitable television camera for use with the present invention is that sold under the name of "Philips Video 40". The output from such a television camera is compatible with further image enhancement, wherreas that of other types of camera proved to be inferior. The picture tube on the monitor provides sharp steady picture in a restful green colour and is still useable under bright lights. The common deficiencies of television images (for example, flicker) have been avoided.

In general, the camera should have good resolution, no 'shading' over the picture, sensitivity to variations in light intensity across the image, and low 'noise'. I should, for preference, be convertible to EIA standards.

The preferred monitor (television screen) should have linear, high gain video amplification, dark glass in the screen,and a long-persistence phosphor (preferably green).

The microscope of this invention has a number of different applications. These include any form of medical, industrial, or scientific application involving the location, examination, or manipulation of small amounts of material. The microscope is particularly suited for use with fluid suspensions of small, transparent objects in shallow containers.

Some examples of uses for the invention are outlined below as follows:

Educational Applications

Showing microscopic objects (particularly biological material, including livign tissues and prepared slides) in colour on the television screen to small discussion groups, whole classes, or even by broadcast.

Biological Applications

Medical

In-vitro fertilisation programmes.

Research procedures (for example, physiology) carried out on microscopic portions of tissues (for example, organ cultures).

Tissue culture work, checking the status of cell cultures in flasks.

Diagnostic procedures involving cell cultures in virology & serology.

Animal science/industry

Embryo collection & storage.

Embryo microsurgery (gene injection, twinning/splitting, etc).

Routine nematode parasitic worm counts in faecal samples.

Fibre analysis (wool).

(The medical list may also be applied to this category.)

Plant science/industry

Organ culture of embryonic plant tissues.

Geology/Mineralogy Applications

Examining suspensions of materials (for example, clay) in conjunction with existing size-analysis machines which process video signals.

The microscope of the present invention consists of two parts:- a microscope unit and a television monitor. They have been designed as an integrated pair. The monitor contains the power supplies for the microscope (for safety reasons) and the microscope carries the controls that affect the image on the monitor (for convenience). Note that the manipulators shown in FIG. 10 are not part of the video inverted microscope. They are necessary for the microsurgical twinning, or splitting, of embryos, and for other tasks involving operations on tiny (microscopic) bodies.

There are few noteworthy features built into the high quality monitor, apart from the inclusion of the power supply and the choice of a special green high-resolution cathode-ray tube (CRT) with dark glass for the display of the projected image.

However, the microscope unit itself embodies the concepts of the invention, and provides something not otherwise available. Its frame is built with thick aluminium sheet, bolted into an inverted 'U' shape. This provides a rigid work table, typically 400×205 mm and 168 mm high. It may, for example, be shaped to suit the embryo transfer application. Under a hole in the centre of the table (the stage) are the objective lenses mounted in alignment with the vertical axis of the illuminator, on a rotating nosepiece in turn mounted on a dovetail slide moved for focusing by a rack and pinion gear system, driven from large knobs protruding from the sides of the microscope. The illuminator can be swung up and out of the way when arranging an experiment.

The focused image from the objective is deflected by a fixed prism horizontally and away from the operator into the television camera; no lenses apart from the objective are used in image formation within the basic microscope. The television camera is a conventional unit; slightly modified by the removal of its mains transformer (for safety) and by a modification for reduced noise. It is used upside-down in order to rectify the image on the monitor.

The video signal from the camera is processed; extra contrast and more control over brightness are most important; video differentiation to enhance fine detail but not overall shading can also be helpful. The controls on the monitor, which are beyond the reach of the operator, are unnecessary.

If desired, additional information to appear on the video screen can be added to the video signal, such as an indication of the date, time, and/or any reference number. This may be useful if the video image is to be recorded, whether on video tape, or by photographing the video screen.

It will be appreciated that the drawings illustrate only a preferred embodiment of the invention, and that many alterations or modifications may be made to the foregoing without departing from the scope of the invention as broadly claimed.

For example, the features and alternatives described above for the various embodiments can be swapped between embodiments. If desired, the television system could be a colour system, to provide improved intelligibility for some types of image.

The optics may be arranged to provide phase or differential interference contrast for improved visibility. There may be two objective lenses and light paths to provide three-dimensional or depth vision.

The electronics may be arranged to provide analogue or digital image enhancement.

The lighting may be polarised. It could, if desired, be infra-red or of any other part of the light spectrum.

The optical path could be varied. For example, the attachment 70 referred to above could be made without a prism. This would make the unit slightly cheaper, although the camera would, for most applications, have to be mounted vertically.

I claim:

1. An inverted microscope having a substantially rigid stage below which is mounted an objective lens, and means for transmitting an image via said lens to a video camera so that, in use, the path of the light from the lens to the camera being free from any means diverting any portion of said light to a path other than said path to the camera, thereby to establish only one said path of light from the lens, whereby substantially all of the light from the lens is directed to the camera.

2. A microscope as claimed in claim 1, further comprising a light source mounted above the stage to direct light downwardly through the object and the objective lens.

3. A microscope as claimed in claim 1, including attachment means whereby the microscope can be releasably coupled to a said camera.

4. A microscope as claimed in claim 1, wherein micromanipulators are located within reach of the stage.

5. A microscope as claimed in claim 1, including a said video camera, arranged to transmit a signal, corresponding to the image from the objective lens, to a video monitor.

6. A microscope as claimed in claim 5, arranged to display on the video monitor a spatially corrected image of the image received by the camera.

7. A microscope as claimed in claim 5, including a monitor provided with a dark screen.

8. A method of viewing an article via a microscope, the method comprising the steps of placing the article on a substantially rigid stage, directing light from the article downwardly through an objective lens, directing substantially all of the light from the lens to a video camera, and viewing on a video monitor the image detected by the camera.

9. A method as claimed in claim 8 further comprising the step of manipulating the article using micromanipulators.

10. A method as claimed in claim 8 further comprising the step of reversing the image on the video monitor as compared with that received by the camera.

11. A method as claimed in claim 8, wherein the video signal from the camera is electronically processed before it is sent to the monitor.

* * * * *